United States Patent [19]

Green

[11] Patent Number: 5,150,714

[45] Date of Patent: Sep. 29, 1992

[54] ULTRASONIC INSPECTION METHOD AND APPARATUS WITH AUDIBLE OUTPUT

[75] Inventor: Philip S. Green, Redwood City, Calif.

[73] Assignee: SRI International, Menlo Park, Calif.

[21] Appl. No.: 698,723

[22] Filed: May 10, 1991

[51] Int. Cl.⁵ .............................. A61B 8/00
[52] U.S. Cl. ...................... 128/660.06; 128/661.03
[58] Field of Search ............... 128/660.01–660.03, 128/661.03–661.07, 661.1, 662.03–662.04, 715, 773; 73/611–617; 381/67

[56] References Cited

U.S. PATENT DOCUMENTS

| | | | |
|---|---|---|---|
| 3,972,228 | 8/1976 | Mansson | 73/67.7 |
| 4,052,977 | 10/1977 | Kay | 128/2 |
| 4,112,927 | 9/1978 | Carlson | 128/2 V |
| 4,220,160 | 9/1980 | Kimball et al. | 128/715 |
| 4,359,056 | 11/1982 | Carlson | 128/660 |
| 4,528,689 | 7/1985 | Katz | 128/715 X |
| 4,594,731 | 6/1986 | Lewkowicz | 381/67 |
| 4,700,711 | 10/1987 | Carlson | 128/660 |
| 4,792,145 | 12/1988 | Eisenberg et al. | 128/715 |
| 4,805,622 | 2/1989 | Riedlinger et al. | 128/660.06 |
| 4,818,938 | 4/1989 | Sattin et al. | 324/309 |
| 4,852,578 | 8/1989 | Companion et al. | 128/661.03 |
| 4,922,917 | 5/1990 | Dory | 128/660.01 |

OTHER PUBLICATIONS

A New Real-Time Ultrasonic Diagonostic System for Dynamic and Still Images, K. Ito et al, JEE, Dec. 1978, pp. 60–64.

Device Makes Echoes to Help Blind Find Way San Jose Mercury News, Mar. 11, 1990.

Primary Examiner—Francis Jaworski
Attorney, Agent, or Firm—Victor Beckman

[57] ABSTRACT

An ultrasonic inspection system and method having an audible signal output is shown which includes an ultrasonic transducer (10) for pulse insonification of an object (12) under control of pulser (14). Echo signals are converted to electrical signals at transducer (10) and the electrical signals are supplied to an A/D converter 30 through amplifiers (18) and (20). Signals from converter (30) are processed to provide for an A-scan of B-scan display at CRT (38). Digital ultrasonic return signals from A/D converter (30) are converted to an audio frequency signal at ultrasound-to-audio converter (50). The audio frequency signal from converter (50) is converted to analog signal form at D/A converter (54) and the analog audio signal is supplied to first and second variable gain amplifiers (58) and (60) the gain of one of which is ramped up while that of the other is simultaneously ramped down. Outputs from the variable gain amplifiers 58 and 60 are supplied to spaced electroacoustic transducers (66L and 66R) to provided an audible presentation having a stereophonic spatial effect dependent upon distance of travel of the reflected ultrasonic wave pulses. A moving cursor (40) is provided at visual display 38, the movement of cursor which is synchronized with the audible presentation.

25 Claims, 4 Drawing Sheets

ULTRASONIC INSPECTION METHOD AND APPARATUS WITH AUDIBLE OUTPUT

FIELD OF THE INVENTION

This invention relates generally to a pulse-echo ultrasonic inspection system and method having an audible signal output.

BACKGROUND OF THE INVENTION

Ultrasonic tissue characterization devices which produce an audible signal which characterizes the biological tissue through which an ultrasonic signal travels are known as shown in U.S. Pat. No. 4,922,917—Dory. There, pulse echo signals from an ultrasonic transducer are used for production of an image of a region of the biological tissue at a visual display. Echo signals from along a scan line in the region are converted to digital signal form and the digital signal is written into memory. Any one of eight segments, or zones, of the memory may be read out at a slow clock rate so as to transpose the ultrasonic frequency of the reflected spectrum into audio frequency signals. The audio frequency signal read from memory is converted to analog signal form and supplied to an electro-acoustic transducer for listening to the same. The $\frac{1}{8}$th segment of the scan line of the image display which corresponds to the $\frac{1}{8}$th segment converted to an audible signal is displayed with overbrilliance to provide the operator with an indication of the segment of the scan line from which the audible signal is obtained. A disadvantage of such an arrangement is that the operator must switch through 8 segments to listen to a complete scan line of audio information. Also, viewing of the image display, or knowledge of a switch setting, is required to provide the operator with information relating to the depth within the tissue from which the audio signal segment is obtained.

Conversion of an audio frequency signal to stereophonic signal form is shown in U.S. Pat. No. 4,594,731—Lewkowicz. There, an electronic stethoscope is shown which includes a contact phone-transducer for the detection of heart sounds. The heart sound signals are frequency multiplied, and the frequency multiplied signals are supplied to first and second amplitude modulators, or variable time gain amplifiers. The gain of one amplifier is ramped up while that of the other is ramped down during the heart cycle whereby the heart beat appears to travel from the listener's right to the listener's left thereby making it easier to detect when, during the heart cycle, a particular sound is occurring. No assistance in depth perception is provided by the stereophonic movement effect of Lewkowicz.

SUMMARY AND OBJECTS OF THE INVENTION

An object of this invention is the provision of an improved ultrasonic inspection method and apparatus having an audible output dependent upon reflections of pulses of ultrasonic energy from discontinuities within an object which avoids the above-mentioned shortcomings and disadvantages of prior art ultrasonic inspection systems.

An object of this invention is the provision of an improved ultrasonic inspection method and apparatus of the above-mentioned type by means of which the operator is better able to distinguish the relative depth of origin of different echo signals.

An object of this invention is the provision of an improved ultrasonic inspection method and apparatus of the above-mentioned type which readily enables the operator to distinguish between reflections from the front and back surfaces of the test object.

In accordance with the present invention an object to be inspected is pulse insonified using an ultrasonic pulse transducer. Echo signals received from over a range of distances within the object are converted by the transducer to ultrasonic frequency electrical signals which, then, are converted to an audio frequency signal as by writing them into memory at a first clock rate and reading them out of memory at a substantially slower clock rate for conversion to the audio frequency signal range. The audio frequency signal is supplied to first and second time variable gain means, such as variable gain amplifiers, the gain of one of which is increased while that of the other is decreased. The amplifier outputs are supplied to spaced-apart electro-acoustic transducers to provide a stereophonic spatial effect. The perceived position of the audible signals from the stereophonic transducers is dependent upon the depth within the object from which the echo signals are received. If reading from memory results in an excessively low audio frequency signal, conversion to a higher audio frequency may be provided prior to conversion to stereophonic signal form. Such conversion may include, for example, envelope detecting the low audio frequency signal and employing the envelope detected signal to modulate a carrier frequency signal of a higher audio frequency, say, 2000 Hz. This modulated carrier frequency signal then may be converted to stereophonic signal form in the manner described above. The system may include an audio signal generator for generation of an audio range marker signal, which signal is combined with the audio frequency signal derived from the echo signals, to provide the operator with a distinctive audible range marker signal. Audible presentation of ultrasonic return signals may be used in conjunction with an A-scan or B-scan display of the return signals, in which case the display may be provided with a moving cursor synchronized with the audible signal so that depth information provided by the moving cursor is directly related to arrival time of the audible return signal.

The invention, together with other objects, features and advantages thereof will be more fully understood from a consideration of the following detailed description of certain embodiments thereof taken in connection with the accompanying drawings. It here will be understood that the drawings are for purposes of illustration only, the invention not being limited to the specific embodiments disclosed therein.

BRIEF DESCRIPTION OF THE DRAWINGS

In the drawings, wherein like reference characters refer to the same parts in the several views.

DETAILED DESCRIPTION OF THE INVENTION

Figure 1:
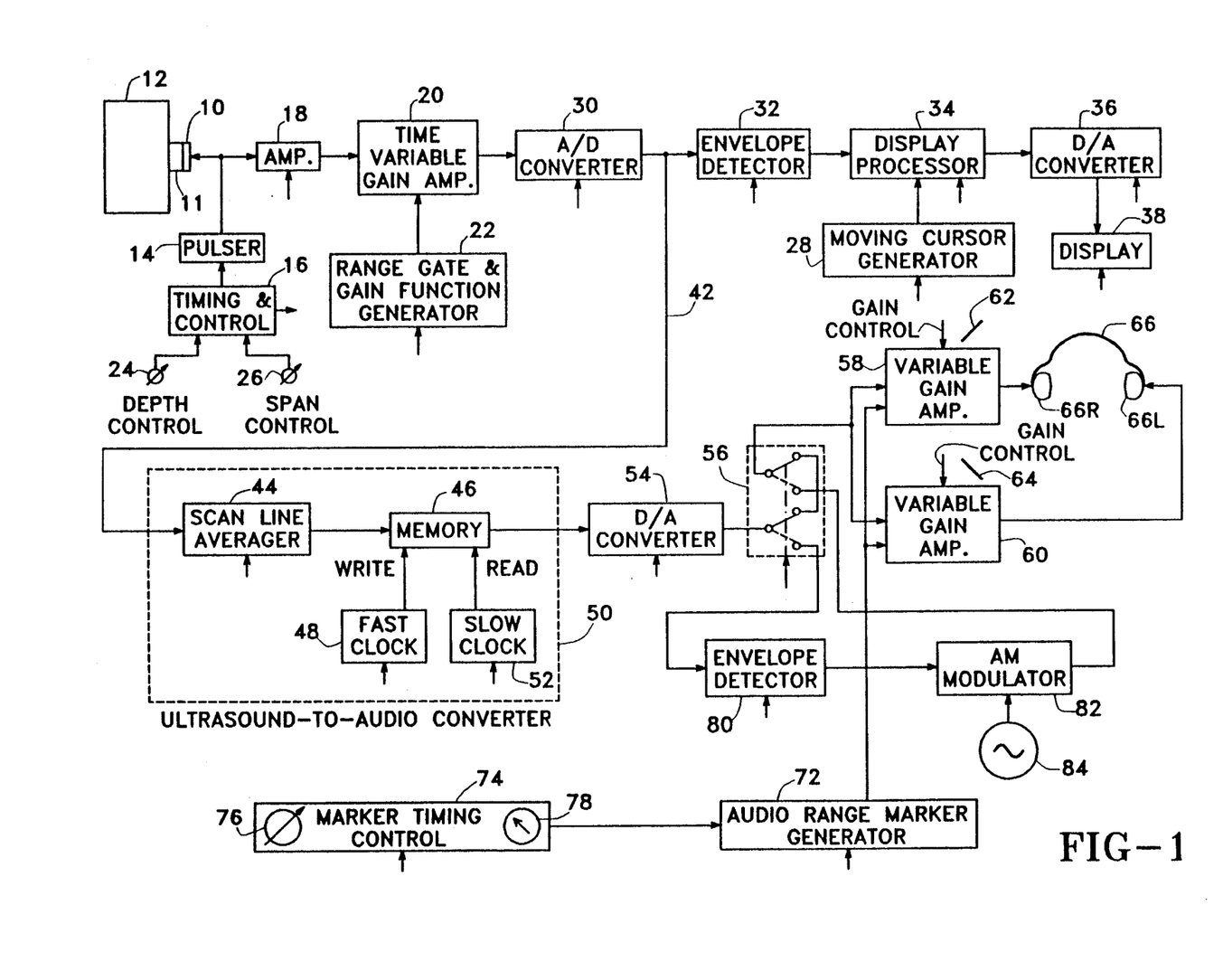
FIG. 1 is a block diagram showing an ultrasonic inspection system embodying the present invention.

Reference first is made to FIG. 1 wherein an ultrasonic inspection system is shown comprising a transducer 10 which, in the illustrated arrangement, is used for transmitting and receiving ultrasonic pulse signals. Transducer 10 may comprise a flat unfocused transducer or a curved focusing transducer for generation of ultrasonic compressional waves which are coupled through acoustic coupling means 11 to an object 12 under investigation and are focused within object 12. In place of a focusing transducer, other acoustical focusing means such as an acoustic lens, a curved acoustical mirror, or the like, may be employed. Also, electronic focusing may be employed in lieu of, or in addition to, acoustical focusing means. Preferably, but not necessarily, focusing during both pulse transmitting and receiving operations is employed.

As will become apparent hereinbelow, the system of this invention may be used in the inspection of a wide variety of objects, or specimens. For example, it may be used in the inspection of living body soft tissue as well as metal, ceramic, plastic, or the like solid articles. Furthermore, it may be used in conjunction with visual display means for A-scan or B-scan display of the echo signals. For purposes of illustration, the systems shown in FIGS. 1 and 5 include visual display means for display of echo signals.

The system of FIG. 1 includes a pulser 14 which is supplied with recurrent timing pulses from a timing and control unit 16 for on-off control thereof. With the pulser turned on, a high frequency energy pulse is generated which is supplied to transducer 10 for pulse energization thereof and pulse insonification of object 12.

Echo signals received by transducer 10 from object 12 are converted to electrical signals by the transducer, which electrical signals are amplified at amplifier 18. Amplified return signals are supplied to a time variable gain amplifier 20, the gain of which is time varied in accordance with the output from a range gate and gain function generator 22. The gain of amplifier 20 is increased in proportion to range so as to offset the loss of signal caused by acoustic absorption within the object 12. Range gate and gain function generator 22 is under control of timing and control unit 16. The portion of the echo signal for conversion to audio signal form and for visual display is selected by the range gate. Operator controlled depth and span controls 24 and 26, respectively, are used to set the depth and span over which return signals are processed by time variable gain amplifier 20. They also are used in the control of a moving cursor generator 28 in a manner described above.

The amplified return signals from amplifier 20 are converted to digital signal form by an analog-to-digital converter 30. If a visual display of return signals is to be provided, the ultrasonic electrical signals are processed to form data for display thereof, which display includes a range dimension. In the arrangement of FIG. 1, such processing includes detecting the A/D converter 30 output as by envelope detector 32. The output signal from detector 32 is proportional to the envelope of the high frequency signal output from A/D converter 30. The detector output is supplied to a digital display processor 34 for processing the signal in preparation for display thereof. The output of moving cursor generator 28 also is supplied to digital display processor 34.

Figure 2:
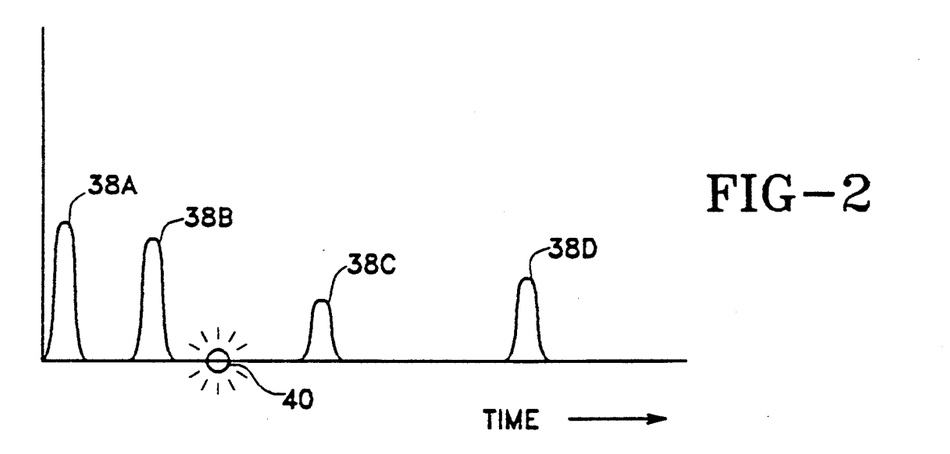
FIG. 2 shows an A-scan display with moving cursor synchronized with the audible signal output.

For an A-scan display with moving cursor, A-scan and moving cursor data are supplied by digital display processor 34 to a digital-to-analog convertor 36 for conversion to analog signal form. The A-scan and moving cursor signals from D/A converter 36 are supplied to visual display means 38, such as a cathode-ray-tube. For an A-scan display, the A-scan signal is supplied to the vertical deflection plates of CRT display 38, and a ramp signal is supplied to the horizontal deflection plates. The moving cursor signal is supplied to the control grid for brightness control of the scan. An A-scan display with moving cursor is shown in FIG. 2. The illustrated A-scan display includes signal 38A received directly from pulser 14, and echo signals 38B, 38C and 38D from the front surface of object 12, a flaw within the object and the back wall of the object, respectively. A continuously moving cursor 40, the movement of which is synchronized with an audible depth-dependent stereophonic signal, also is shown in FIG. 2. Movement of cursor 40 is described in detail hereinbelow following a detailed description of the generation of the stereophonic audio signal.

As seen in FIG. 1, the digitized ultrasonic frequency echo signal from A/D converter 30 is supplied over line 42 to ultrasonic-to-audio frequency converter means 50. Converter 50 includes a scan line averager circuit 44 where several return signals are averaged in time coincidence to minimize digitization and amplification noise. The scan line from averager 44 is written into memory 46 using a fast write clock 48. Memory 46 simply may comprise a read/write random access memory of conventional design. Scan line averaging and writing into and reading from memory may be performed by use of a microcomputer.

The scan line signal in memory 46 is converted to an audio frequency signal by reading from memory 46 at a slow clock rate under control of slow clock 52. For example, by reading out of memory 46 at a rate of 1/10,000 of the rate at which the scan line is written into memory, a 5 MHz ultrasonic frequency signal is converted to a 500 Hz audio frequency signal. Similarly, by reading out at a rate of 1/100,000 of the rate at which a 5 MHz ultrasonic frequency signal is written into memory, a 50 Hz audio frequency signal is produced at the memory output. The fast clock rate for writing into memory is directly dependent upon the speed of operation of A/D converter 30 which, in turn, must operate at at least the Nyquist rate. As described below, the rate at which the slow clock operates is chosen, primarily, on the basis of the desired amount of time to read the scan line from memory.

The digital audio frequency signal from converter memory 46 is supplied to digital-to-analog converter 54 for conversion to analog signal form. The analog audio signal output from D/A converter 54 is supplied to a switch 56. In the illustrated switch position the audio frequency signal is fed to first and second variable gain amplifiers 58 and 60, the gain of which amplifiers is controlled by gain control signals 62 and 64 at the gain control inputs thereof. Control signals 62 and 64 vary inversely with respect to each other over the time period that the analog audio frequency signal is read from memory 46. Substantially ramp gain control signals may be used whereby the output from amplifier 58 is steadily increased while that of amplifier 60 is steadily decreased as the audio frequency signal is supplied to the amplifiers. Amplifier outputs are supplied to spaced electroacoustic transducers 66L and 66R of, say, a set of earphones 66.

With this novel arrangement, echo signals are perceived to be spatially separated within the operator's head. If the depth and span controls are set to include echoes from interfaces at both the front and back of the object, then an echo from the front would be heard in one ear while that from the back would be heard in the other ear. Return signals from discontinuities within the object would appear to be physically spaced therebetween. With this arrangement, a stereophonic spatial effect dependent upon distance of travel of the reflected ultrasonic wave pulses is provided which provides the operator with both a sense of depth and space of echo signals.

If desired, one or more range markers may be included in the audible presentation to the operator. To this end, an audio range marker generator 72 is provided having an audio frequency signal output which is supplied to variable gain amplifiers 58 and 60 along with the audio frequency signals from D/A converter 54. Audio range marker generator 72 provides an audio signal output which is readily distinguishable from audio return signals from D/A converter 54. A variable marker timing control unit 74 with manual control means 76 is connected to audio range marker generator 72 for controlling the timing of operation thereof. Indicator means, such as visual indicator 78, provides the operator with an indication of the timing of the control unit output relative to operation of slow clock 52 thereby providing the operator with a measure of depth at which the audio range marker occurs. Obviously, the ultrasonic signal velocity within object 12 and the acoustic path length through acoustic coupling means 11 must be considered in the calibration of marker timing control unit 74. Also, in place of visual indicator 78, audible indicator means may be used to provide for an audible voice signal indication of the selected depth setting. For example, a synthesized voice indicating the selected depth setting may be supplied to earphones 66.

Figure 3:
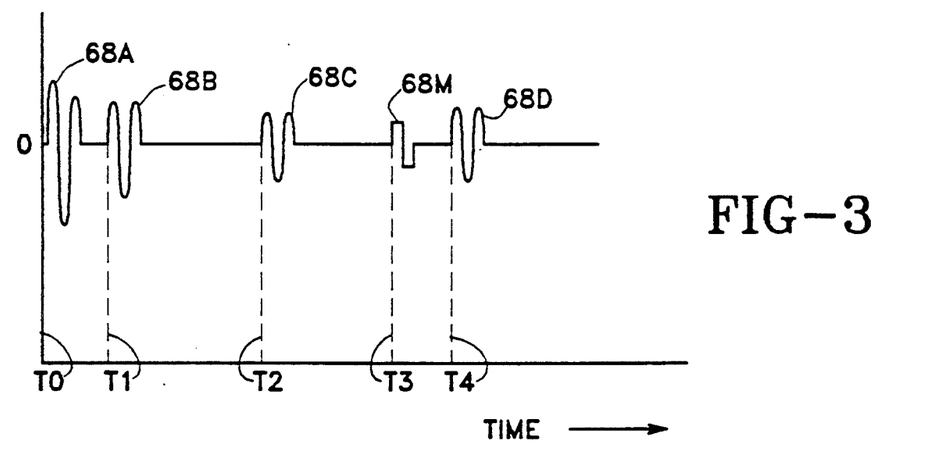
FIG. 3 shows audio frequency signals produced by the system of this invention.

Reference now is made to FIG. 3 wherein audio frequency signals from D/A converter 54 together with an audio range marker signal 68M from generator 72 are shown. For purposes of illustration, audio frequency signals 68A, 68B, 68C and 68D from D/A converter 54 are shown wherein signal 68A is produced by operation of pulser 14 at time T0, and signals 68B, 68C and 68D are produced in response to echo signals from the front face of object 12, a flaw within object 12 and, the back wall of object 12 at times T1, T2, and T4 respectively. In addition, at time T3 marker signal 68M from audio range marker generator 72 is shown positioned intermediate the return signal 68C from a flaw and return signal 68D from the back of the object. It here will be noted that means, not shown, may be included for visual display of range marker signals at display 38 in correspondence with audible range marker signals from audio range marker generator 72.

One application of the present system includes use as a thickness monitor, or gauge, in which case marker 68M may be set at the desired thickness of object 12, under operator control of unit 74. As seen in FIG. 3, audio marker signal 68M occurs before return signal 68D from the rear wall of object 12. If marker signal 68M is set to occur at the desired thickness of object 12, its occurrence prior to return 68D from the back wall indicates that the object thickness exceeds that identified by marker signal 68M. Similarly, if marker signal 68M occurs after return signal 68D, it is known that object 12 is too thin at that location. Obviously, if return signal 68D and marker signal 68M coincide in time, it is known that the object is of the desired thickness.

Audio range marker signal 68M also may be used to provide an indication of depth of the flaw identified by return signal 68C. By moving range marker signal 68M by use of control 76 to coincide in time with return signal 68C a measure of depth of the flaw is indicated at indicator 78 of control unit 74.

Figure 4:
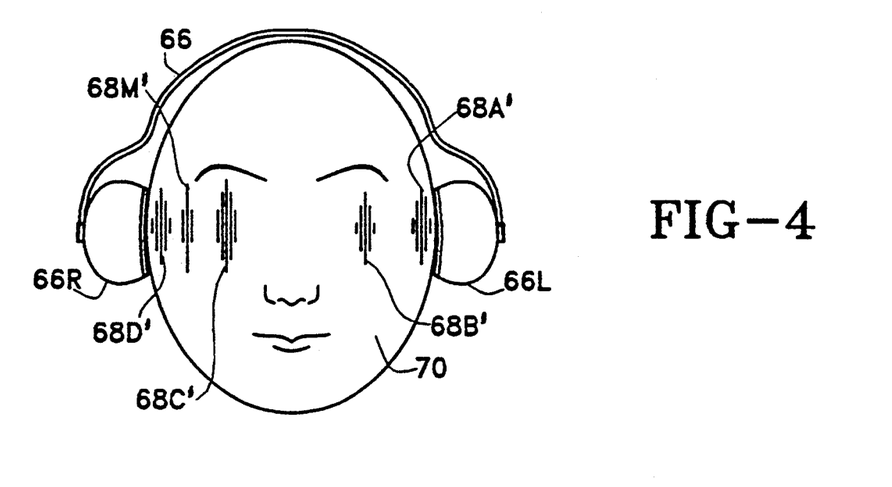
FIG. 4 shows the perceived spatial location of the audio frequency signals of FIG. 3 within the operator's head.

Reference now is made to FIG. 4 wherein the perceived locations 68A', 68B', 68C', 68M' and 68D' (FIG. 4) of audio frequency signals 68A, 68B, 68C, 68M and 68D, respectively, (FIG. 3) within the head of an operator 70 are shown. As shown in FIG. 3, and described above, signal 68A is produced by operation of pulser 14 at time T0, signals 68B, 68C and 68D are produced in response to echo signals from the front face of object 12, a flaw within object 12 and, the back wall of object 12 received at times T1, T2 and T4, respectively, and marker signal 68M from range marker signal generator 72 is produced at time T3 between flaw signal 68C and rear wall signal 68C. At time T0, the gain of amplifier 60 is maximum whereas that of amplifier 62 is minimum. Consequently, audio frequency signal 68A is heard through the left ear of operator 70 but not the right ear, and in the operator's head this signal is perceived as being spatially located at point 68A' to the operator's left. With the illustrated ramp gain control signals for variable gain amplifiers 58 and 60, echo signals 68B, 68C and 68D are perceived as being progressively spaced to the right of point 68A' within the operator's head, at points 68B', 68C' and 68D', respectively, and marker signal 68M is perceived as being physically located at point 68M' between point 68C' and 68D', as shown in FIG. 4. With this novel arrangement the operator is able to audibly distinguish between return signals from the front and rear faces of object 12 even though the signals may be of substantially the same amplitude.

It will be apparent that the stereophonic presentation of ultrasonic return signals may be utilized in a system which does not include a visual display of return signals. It may be used as a total replacement for a visual presentation in, say, nondestructive testing, especially for field use. For example, someone inspecting pipes in a nuclear reactor could keep their eyes on the transducer in their hand and on the pipe being scanned, while listening to the return. Not only is depth transformed into arrival time of audiblized ultrasonic echoes, but the echoes are perceived to be spatially separated because of the stereophonic effect. With this arrangement, the operator need not divide his visual attention between placement of the transducer on the workpiece and a visual display. As a result, inspection should proceed more rapidly.

When an audible presentation of ultrasonic return signals is used in conjunction with an A-scan or B-scan display of return signals, the display may be provided with a moving cursor which, in the illustrated system is provided by moving cursor generator 28 under control of timing and control unit 16. For purposes of illustration, an A-scan display is shown in FIG. 2, to which figure reference again is made. For the illustrated A-scan, moving cursor generator 28 may generate a control signal for application to the control grid of CRT 38 to recurrently increase the brilliance of a portion of the display to provide the moving cursor.

Assume for present purposes that slow clock 52 operates at a rate so as to read the scan line information stored in memory 46 over a period of, say, 3 seconds. It here will be noted that if information is read out over too short a period, say 0.5 seconds, the operator may have difficulty in audibly resolving adjacent echoes, and if it is read out over too long a period, say 10 seconds, the operator may have difficulty concentrating on the audible signal over such a length of time. Although not limited thereto, audible time periods on the order of 2 to 4 seconds have been determined to be satisfactory under certain operating conditions. If a scan line is read from memory over a time period of 3 seconds, and the system operates at a pulse repetition frequency of, say, 3 KHz, then 9,000 scan lines of information for display will be produced during the three second read out period. Movement of the cursor along the A-scan trace is synchronized with the audio frequency signal output from memory 46 so that the operator is provided with an audible presentation of ultrasonic return signals which is synchronized with cursor movement at the visual display.

As is well understood, the velocity of sound is different in different materials. In living body soft tissue sound velocity is on the order of 1.5 mm/$\mu$sec, and in steel it is on the order of 4.5mm/$\mu$sec. If, for example, soft tissue over a range, or span, of 225 mm is to be imaged or inspected, the round trip period is $$(225 \; mm \times 2)/(1.5 \; mm/\mu sec) = 300 \mu sec \qquad (1)$$

Therefore, each scan line of information is written into converter 50 over a period of 300 $\mu$sec. To provide for a 3 second audible presentation, scan line information must be read from converter 50 at 1/10,000th the rate at which it is written. Assuming a 5 MHz operating frequency, the resultant audio frequency signal will equal $$5 \; MHz/10,000 = 500 \; Hz \qquad (2)$$

The 500 Hz audio frequency signal is well within the range of signals audible to most operators.

Now assume that steel over a range of 45 mm is to be inspected. In this case the round trip period is $$(45 \; mm \times 2)/(4.5 \; mm/\mu sec) = 20 \mu sec \qquad (3)$$

Each scan line of information is written into converter 50 over the 20 $\mu$sec period. To provide for a 3 second audible presentation of the line of information, information must be read from converter 50 at 1/150,000th the rate at which it is written. Again, assuming a 5 MHz operating frequency the resultant audio frequency signal will equal $$5 \; MHz/150,000 = 33.3 \; Hz \qquad (4)$$

As is well understood, such low frequency sound is not readily detected by many persons unless the sound is quite loud.

If needed, or required, the audio frequency signal from converter 50 may be increased in frequency before converting to an audible frequency sound. For example, a frequency multiplier may be used to increase the frequency thereon. Alternatively, the low audio frequency signal may be envelope detected and the detected signal used to modulate a carrier signal of higher frequency. Such an arrangement is illustrated in FIG. 1. There, with switch 56 in the broken line position, the audio frequency signal from D/A converter 54 is supplied to an envelope detector 80. The signal from detector 80 is supplied to AM modulator 82 which also is provided with a carrier frequency signal from signal source 84. A carrier frequency which is greater than the audio frequency signal from D/A converter 54 is employed. For example, an easily heard 1000 Hz carrier frequency may be employed. The modulated carrier frequency output from modulator 82 is supplied through switch 56 to amplifiers 58 and 60 for production of a stereophonic signal in the manner described above.

Figure 5:
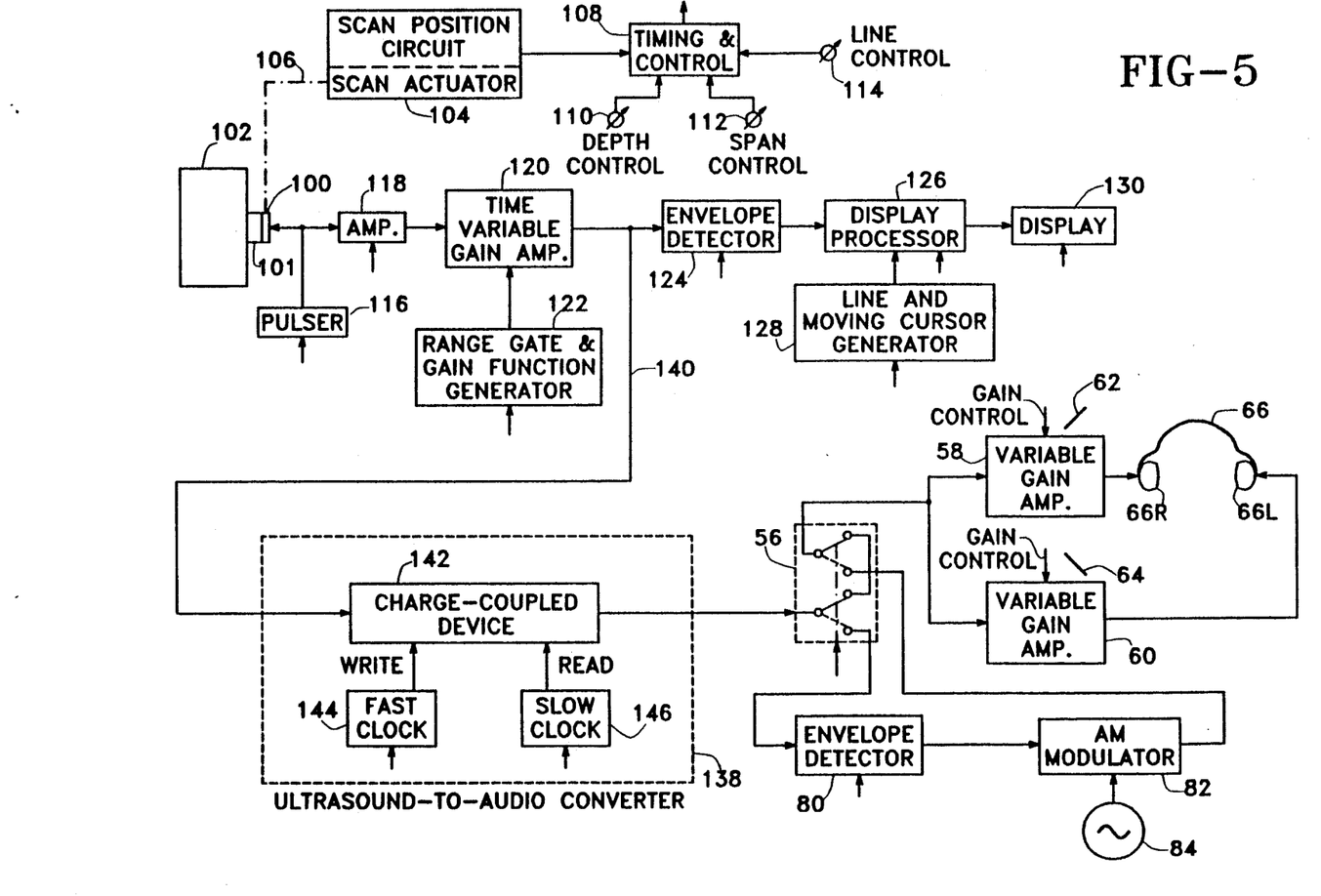
FIG. 5 is a block diagram showing a modified form of ultrasonic inspection system which embodies this invention.

Reference now is made to FIG. 5 wherein a modified form of this invention is shown which includes a B-scan display and a different form of ultrasound-to-audio signal converter means. There, focusing ultrasonic transducer 100 is shown acoustically coupled through acoustic coupling means 101 to object 102 under investigation. Transducer 100 is sector scanned by scan actuator 104 connected thereto through mechanical linkage 106. The scanning mechanism includes a scan position information circuit having an output connected to timing and control unit 108 which, in turn, has outputs for synchronizing the transmitting, receiving and display scanning operations. Other inputs for timing and control unit 108 include depth and span controls 110 and 112, respectively, which, as described above, are used to establish the depth and span over which echo signals are processed. A line control 114 is also provided for selection of the scan line along which the audio frequency signal for presentation to the operator is to be obtained, and for control of a line cursor for visual display of the selected scan line.

As with the system of FIG. 11, pulser 116 recurrently supplies transducer 100 with high frequency energy pulses for pulse insonification of object 102. Return signals are amplified by amplifier 118 and by time variable gain amplifier 120 under control of range gate and gain function generator 122. The operator depth and span controls 11? and 112 are used to set the depth and span over which the return signals are processed by time variable gain amplifier 120.

Figure 6:
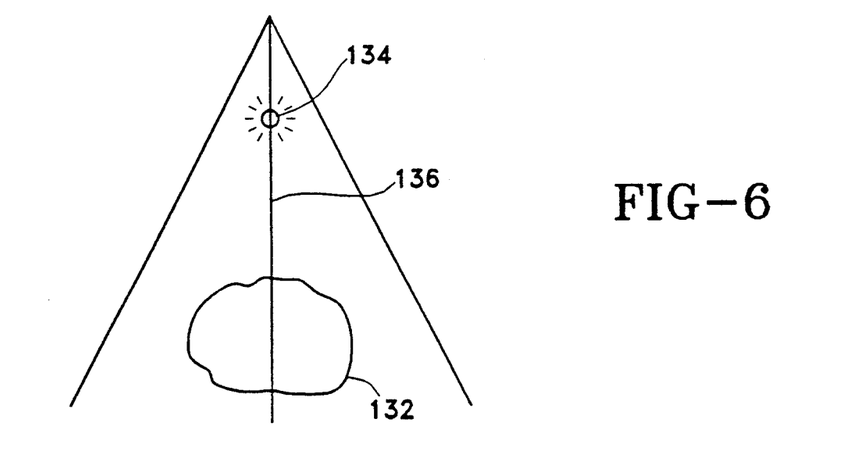
FIG. 6 shows an ultrasonic B-scan image display with a moving cursor synchronized with the audible signal output.

For visual sector scan display, the time variable gain amplifier 120 output is envelope detected by envelope detector !24. The envelope detector output is supplied to a display processor 126 which also includes inputs from line and moving cursor generator 128. The display processor output is supplied to visual display means 130 comprising, for example, a cathode ray tube. Sweep angle and range deflection signals are supplied to deflection plates of CRT 130, and the envelope detector output is connected as a Z-axis signal for intensity modulation of the CRT beam in accordance with the amplitude thereof for a real time plan position type of display. Additionally, line and moving cursor signals are supplied to the display from line and moving cursor generator 128. As shown in FIG. 6, a sector scan displaying an object 132 is provided at display 130, together with a moving cursor 134 and line cursor 136 for display of the line along which the moving cursor travels.

Referring again to FIG. 5, the audio presentation portion of the illustrated system includes an ultrasound-to-audio frequency signal converter 138 to which the output from time variable gain amplifier 120 is supplied over line 140. Converter 138 comprises charge-coupled device 142 together with a fast write clock 144 and slow read clock 146. An ultrasonic frequency return signal is written into charge-coupled device 142 under control of fast clock 144. The scan line selected for storage is controlled by line control 114, and the position of the selected scan line is visually displayed as seen in FIG. 6 by line 136. Obviously, if desired, information from several scan lines may be averaged before writing into charge-coupled device 142 in the manner shown in FIG. 1 and described above.

The ultrasonic scan line information contained in charge-coupled device 142 is converted to an audio frequency signal by reading out therefrom at a slow clock rate under control of slow clock 146. As described above, the slow clock rate employed is substantially dependent upon the desired duration of the audio signal. Again, as noted above, operators often find a two to four second duration to be satisfactory.

The audio frequency signal from converter 138 is converted to stereophonic signal form in the manner described above. The remainder of the circuit may be the same as that shown in FIG. 1 and described above, and includes switch 56, first and second variable gain amplifiers 58 and 60, and earphones 66 to which the amplifier outputs are supplied to provide for the stereophonic audio frequency signal. If the frequency of the audio frequency signal from converter 138 is too low, it may be increased by use of envelope detector 80 and AM modulator 82 before supplying the same to variable gain amplifiers 58 and 60. Movement of moving cursor 134, shown in FIG. 6, is synchronized with the stereophonic sound output. If, for example, charge-coupled device 142 is read out over a three second period, cursor 134 moves the length of line 136 over the same three second time period. Obviously, the FIG. 5 arrangement may include an audio range marker generator 72 and associated marker timing control unit 74 of the type shown in FIG. 1 and described above.

Figure 7A:
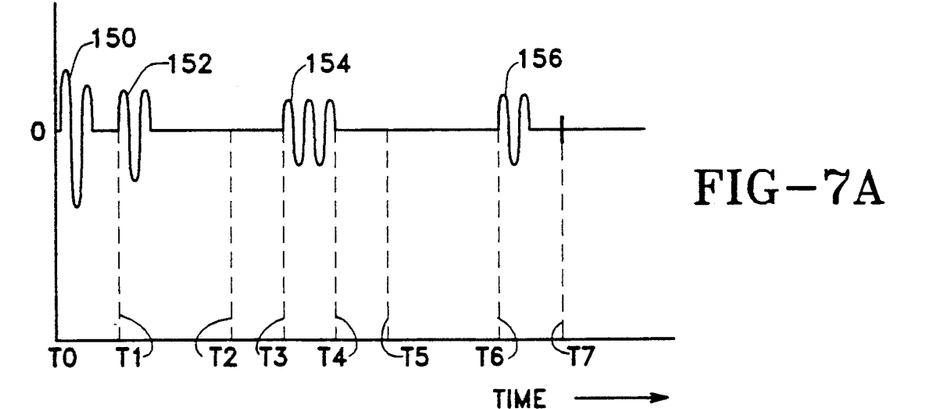
FIGS. 7A and 7B show audio frequency signals using different range gating settings to facilitate separation of closely occurring return signals.

With the present invention it is possible to audibly resolve closely positioned flaws which are located at slightly different depths. In FIG. 7A, to which reference now is made, audio signals obtained using the present invention with a range gate setting which extends from time T0 to T7 are shown. The illustrated audio signals include signal 150 produced upon operation of the pulser (pulser 14, in FIG. 1 or pulser 116 in FIG. 5), signal 152 produced by the return from the front surface of the object under investigation, signal 154 produced by the return from one or more defects within the object, and signal 156 produced by the return from the rear surface of the object.

Figure 7B:
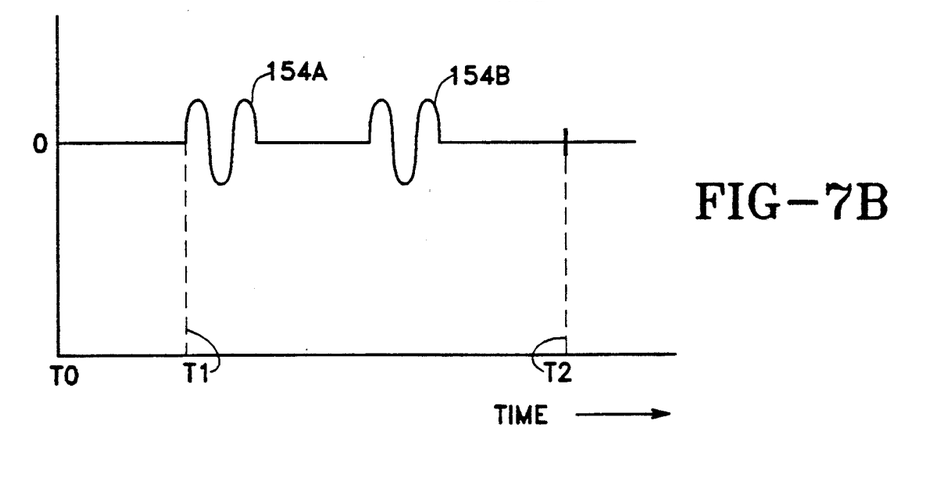

Any desired portion of the audio signals shown in FIG. 7A may be examined in greater detail by reading that portion from memory (46 or 142) at a slower clock rate. For example, to examine audio signal 154 in greater detail, that portion of memory containing the signal between, say, times T2 and T5 of FIG. 7A may be read at a slower clock rate. The resulting audio signal is shown in FIG. 7B. Signal 154 of FIG. 7A which appears as a single return is, in fact, comprised of two separate signals 154A and 154B as seen in FIG. 7B. By reading out that portion of the return located between times T2 and T5 of FIG. 7A at a slower clock rate as illustrated in FIG. 7B, the time interval between audio signals 154A and 154B may be increased to a point that they are individually identifiable by the operator. However, the audio frequency signal is reduced in frequency, and it may be required to increase the frequency thereof as by use of envelope detector 80, modulator 82 and carrier signal generator 84 in the manner described above.

Although operation of the embodiments shown in FIG. 1 and 5 is believed to be apparent from the above description, a brief description thereof now will be provided. In the arrangement of FIG. 1, object 12 is pulse insonified by ultrasonic transducer 10 connected to pulser 14. Return, or echo, signals received by transducer 10 from the object are converted by the transducer to electrical signals. An A-scan display of the echo signals is provided at display 38. Except for the inclusion of a moving cursor 40, shown in FIG. 2, synchronized with an audio signal derived from echo signals, the receiver section for visual display may be of conventional design. For purposes of illustration, return signals are amplified at amplifier 18, time gain amplified at time variable gain amplifier 20 under control of range gate and gain function generator 22, converted to digital signal form at A/D converter 30, detected at envelope detector 32, and supplied to display processor 34 in preparation for display at CRT 38 after conversion to analog signal form at D/A converter 36. Moving cursor signal generator 28 generates a moving cursor signal which is supplied to CRT 38 through display processor 34 and D/A converter 36 for display of moving cursor 40, shown in FIG. 2.

The digitized ultrasonic return signal from D/A converted 30 is supplied to ultrasound-to-audio frequency converter 50 for conversion to audio frequency signal form. Conversion to audio frequency signal form may be effected using conventional frequency converting means. In the FIG. 1 embodiment, several scan lines are averaged in time coincidence at scan line averager 44 so as to minimize amplification and digitization noise. The resultant averaged scan line signal is written into memory 46 at a fast rate dependent upon the rate of operation of A/D converter 30. Conversion to audio signal form is provided by reading from memory 46 at a substantially slower clock rate under control of slow clock 52. The read rate selected determines the time required to read the information from memory 46. Reading over a several second time period generally provides the operator with the ability to resolve echo signals obtained from different depths without unduly prolonging the audio signal period.

The audio frequency signal from converter 50 is converted to analog signal form at D/A converter 54. If the frequency of the audio frequency signal is not too low, it is directly supplied through switch 56 to first and second variable gain amplifiers 58 and 60, the gain of which amplifiers is inversely varied during the period of time that memory 46 is being read. The gain of amplifier 58 is increased, as indicated by gain control signal 62, while that of amplifier 60 simultaneously is decreased, as indicated by gain control signal 64. If, for example, return signals from both the face and back of the object 12 are processed, those from the face will be heard in one ear while those from the back wall will be heard in the other ear. If the range gate is adjusted to begin operation immediately prior to reception of the front wall reflection and to end immediately after the back wall reflection, the operator will have no difficulty in discriminating between the two due to the stereophonic spatial effect provided by the invention, even if the front and rear wall echo signals are of substantially the same amplitude. The operator is provided with an indication of depth of echo signals from discontinuities between the front and back walls of object 102 by the relative magnitude of the audible signals from the spaced electro-acoustic transducers of earphones 66.

Movement of moving cursor 40, shown in FIG. 2 is synchronized with the audio signal output so that the cursor traverses the display simultaneously with the audible presentation of the ultrasonic return signal.

If the audio frequency signal is of too low a frequency to be easily heard by the operator it may be increased by switching the output from D/A converter 54 to frequency increasing means comprising envelope detector 80 and AM modulator 82. A carrier frequency signal at the desired audio frequency, or frequencies, is supplied to modulator 82 from carrier wave generator 84. For example, the carrier wave generator 84 may be used to generate a narrowband noise signal. The signal from envelope detector 80 modulates the carrier signal at AM modulator 82, and the AM modulator output is supplied to the variable gain amplifiers 58 and 60 for generation of a stereophonic signal in the manner described above. With this operation, the envelope detector 80 output is dependent upon amplitude of frequency components included in the audio frequency signal from D/A converter 54 and not directly upon the frequency of such components. Amplitude information, but not frequency information, is retained in the envelope detector 80 output and, consequently, in the output of AM modulator 82. The higher, modulated, carrier signal from AM modulator 82 is more readily sensed by the operator than the lower frequency audio signal from D/A converter 54. If desired, a distinctive audio range marker signal 68M, shown in FIG. 3, may be included in the audible presentation by operation of audio range marker generator 72.

In the FIG. 5 arrangement, the system functions in the B-scan mode. There, high frequency energy pulses are supplied to transducer 100 from pulser 116 for pulse insonification of object 102 along the acoustic axis of the transducer. Transducer 100 is oscillated under control of scan actuator 104 for sector scanning to provide for a two-dimensional display at display unit 130, as illustrated in FIG. 6. Echo signals received by transducer 100 are converted to electrical signals which are amplified by amplifier 118 and time variable gain amplifier 120. The ultrasonic return signal is envelope detected at envelope detector 124, and the detector output is supplied to a display processor in preparation for a plan position indicator type display at CRT 130. A line and moving cursor generator 128 provides display processor 126 with line 136 and continuously moving cursor 134 signal information shown in FIG. 6 for combination with the ultrasonic image information from envelope detector 124. Except for the inclusion of a continuously moving cursor 134 synchronized with an audio signal derived from return signals, the receiver section for visual display may be of any suitable conventional design.

The ultrasonic return signal from time variable gain amplifier 120 is converted to audio frequency signal form at ultrasound-to-audio converter 138 comprising a charge-coupled device 142. The return signal is written into the charge-coupled device at a fast clock rate under control of clock 144, and is read out therefrom at a substantially slower clock rate under control of slow clock 146. By reading over a several second interval of time, the ultrasonic signal stored in charge-coupled device 142 is converted to an audio frequency signal in analog-signal form, which audio frequency signal is processed in the manner described above with reference to FIG. 1 for presentation of a stereophonic signal at headphones 66. Movement of moving cursor 134 is synchronized with the generation of the audio frequency signal obtained during read-out of charge-coupled device 142.

The invention having been described in detail in accordance with requirements of the Patent statutes, other changes and modifications will suggest themselves to those skilled in this art. For example, translational movement of the ultrasonic transducer may be employed for a B-scan display made up of parallel scan lines. Obviously, the invention may employ an electronically focused and/or scanning transducer array rather than acoustically focused transducers. As noted above, where a stereophonic audio output is provided as shown, no visual display of return signals is required. Also where a moving cursor display synchronized with an audio presentation is provided, it will be apparent that the audio presentation need not be in stereophonic signal form. For example, in place of the pair of variable gain amplifiers 58 and 60, the audio signal output from switch 56 simply may be amplified and supplied to an electro-acoustic transducer for presentation of a monaural audio signal synchronized with the display of a moving cursor at a display unit. Also, it will be apparent that range gating may be provided at any convenient location. For example, range gating for the audio presentation portion of the system may be provided by timing of the writing operation of the ultrasound-to-audio converter. In the FIG. 1 arrangement, timing of operation of A/D converter 30 may be used to range gate both the visual display and audio presentation portions of the system. Also, other operating modes are possible. For example, the range gate may be adjusted to receive a plurality of reverberations from within the object, particularly where the object is of relatively thin material. The reverberation frequency, or rate, is dependent upon thickness of the object, and changes in the rate produced by changes in thickness are readily detected audibly by the operator. It is intended that the above and other such changes and modifications shall fall within the spirit and scope of the invention defined in the appended claims.

I claim:

1. An ultrasonic inspection method employing reflections from discontinuities within an object of recurrent transmitted pulses of ultrasonic energy comprising:
   recurrently transmitting pulses of ultrasonic energy into an object along a beam axis,
   receiving by transducer means reflected ultrasonic wave pulses from over a range of distances within the object and converting the same to ultrasonic electrical signals,
   converting ultrasonic electrical signals from the transducer means received during at least a portion of said range to an audio frequency signal,
   converting the audio frequency signal to first and second audio frequency signals of simultaneously increasing and decreasing amplitude, respectively, and
   converting the first and second audio frequency signals to audible signal form at first and second spaced locations to provide an audible presentation having a stereophonic spatial effect dependent upon distance of travel of the reflected ultrasonic wave pulses for an audible indication of depth of reflections.

2. A method as defined in claim 1 wherein the step of converting ultrasonic electrical signals includes writing ultrasonic electrical signals into memory means at a first rate, and reading signals from said memory means at a second rate which is slower than the first rate to produce an audio frequency signal.

3. A method as defined in claim 2 wherein the memory means employed comprises a charge-coupled device.

4. A method as defined in claim 2 wherein the memory means employed comprises a read/write random-access memory, said method including:

converting ultrasonic electrical signals to digital signal form before writing the same into said read/write random-access memory, and converting the audio frequency signal read from said read/write random-access memory to analog signal form.

5. A method as defined in claim 1 including increasing the frequency of the audio frequency signal before converting the same to first and second audio frequency signals.

6. A method as defined in claim 5 wherein the step of increasing the frequency of the audio frequency signal includes, envelope detecting the audio frequency signal read from said memory means, generating a carrier frequency signal in the audio frequency range, and modulating the carrier frequency signal by the envelope detected audio frequency signal.

7. A method as defined in claim 1 including processing ultrasonic electrical signals from the transducer means to form data for display thereof which display includes a range dimension.

8. A method as defined in claim 7 including displaying a moving cursor synchronized with said audible presentation.

9. A method as defined in claim 8 which includes an A-scan display of ultrasonic electrical signals and moving cursor.

10. A method as defined in claim 8 which includes a B-scan display of ultrasonic electrical signals and moving cursor.

11. A method as defined in claim 1 including generating an audio range marker signal at a selected time during conversion of ultrasonic electrical signals form the transducer means to an audio frequency signal, and combining said audio range marker signal with said audio frequency signal to provide the audible presentation with an audible marker signal.

12. An ultrasonic inspection method employing reflections from discontinuities within an object of recurrent transmitted pulses of ultrasonic energy comprising:

recurrently transmitting pulses of ultrasonic energy into an object along a beam axis, receiving by transducer means reflected ultrasonic wave pulses from over a range of distances within the object and converting the same to ultrasonic electrical signals, processing ultrasonic electrical signals to form data for display thereof which display includes a range dimension, converting ultrasonic electrical signal to an audio frequency signal, converting the audio frequency signal to audible signal form to provide an audible presentation of ultrasonic electrical signals, and displaying with the processed ultrasonic electrical signals a continuously moving cursor that continuously moves during the audible presentation in synchronization with the audible presentation.

13. An ultrasonic inspection method employing reflections from discontinuities within an object of recurrent transmitted pulses of ultrasonic energy comprising:

recurrently transmitting pulses of ultrasonic energy into an object along a beam axis, receiving by transducer means reflected ultrasonic wave pulses from over a range of distances within the object and converting the same to ultrasonic electrical signals, processing ultrasonic electrical signals to form data for display thereof which display includes a range dimension, converting ultrasonic electrical signals to an audio frequency signal, converting the audio frequency signal to audible signal form to provide an audible presentation of ultrasonic electrical signals, displaying with the processed ultrasonic electrical signals a moving cursor in synchronization with the audible presentation, generating an audio range marker signal at a selected time during conversion of ultrasonic electrical signals to an audio frequency signal, and combining said audio range marker signal with said audio frequency signal to provide the audible presentation with an audible marker signal.

14. An ultrasonic inspection system responsive to reflections from discontinuities within an object of recurrent transmitted pulses of ultrasonic energy comprising:

ultrasonic transducer means, pulse transmitter means for pulse energizing said transducer means for recurrently transmitting ultrasonic energy into an object under inspection, said transducer means receiving reflected ultrasonic wave pulses from over a range of distances within the object and converting the same to ultrasonic electrical signals, means for converting ultrasonic electrical signals from the transducer means which are received from over at least a portion of said range to an audio frequency signal, first and second time variable means for simultaneously respectively increasing and decreasing the audio frequency signal amplitude with time, and first and second electro-acoustic transducer means responsive to outputs from said respective first and second time variable means for audibly reproducing said time varying audio frequency signals to provide an audible presentation having a stereophonic spatial effect dependent upon distance of travel of said reflected ultrasonic wave pulses to provide an audible indication of depth of reflections.

15. An ultrasonic inspection system as defined in claim 14 wherein said converting means includes memory means into which ultrasonic electrical signals from said transducer means are written at a first rate, and means for reading signals from said memory means at a second rate slower than the first rate for production of said audio frequency signal.

16. An ultrasonic inspection system as defined in claim 15 wherein said memory means comprises a charge-coupled device.

17. An ultrasonic inspection system as defined in claim 15 wherein said memory means comprises a read/write random-access memory.

18. An ultrasonic inspection system as defined in claim 14 including means for increasing the frequency of the audio frequency signal from said converting means.

19. An ultrasonic inspection system as defined in claim 18 wherein said frequency increasing means comprises an envelope detector responsive to the audio frequency signal,
- an audio carrier frequency generator having an audio frequency carrier signal of greater frequency than the audio frequency signal, and
- means for amplitude modulating the carrier signal by the envelope detector output.

20. An ultrasonic inspection system as defined in claim 14 including visual display means,
- means for processing ultrasonic electrical signals to provide display signals for display of at least one line of reflected signal information,
- moving cursor generator means for generating a moving cursor signal for display of a moving cursor, and
- means for synchronizing operation of said converting means and moving cursor generator means for synchronizing display of the moving cursor with the audible presentation.

21. An ultrasonic inspection system as defined in claim 20 wherein said visual display means comprises an A-scan display.

22. An ultrasonic inspection system as defined in claim 20 wherein said visual display means comprises a B-scan display.

23. An ultrasonic inspection system as defined in claim 14 including a signal generator for generating an audio range marker signal at a selected time during operation of said ultrasonic electrical signal converting means, and
- means for combining said audio range marker signal with the audio frequency signal from said ultrasonic electrical signal converting means to provide the audible presentation with an audible marker signal.

24. An ultrasonic inspection system responsive to reflections from discontinuities within an object of recurrent transmitted pulses of ultrasonic energy comprising:
- ultrasonic transducer means,
- transmitter means for pulse energizing said transducer means for recurrently transmitting ultrasonic energy into an object, said transducer means receiving reflected ultrasonic wave pulses from over a range of distances within the object and converting the same to ultrasonic electrical signals,
- visual display means,
- means for processing ultrasonic electrical signals from the transducer means received over said range to form data for display at said visual display means of at least one line of reflected signal information,
- means for converting ultrasonic electrical signals from the transducer means which are received from over at least a portion of said range to an audio frequency signal,
- electro-acoustic transducer means responsive to the audio frequency signal from said converting means to provide an audible presentation thereof, and
- moving cursor signal generator means for generating a moving cursor signal for display of a continuously movable cursor at said visual display means during the audible presentation, the movement of which continuously movable cursor is synchronized with the audible presentation from the electro-acoustic transducer means.

25. An ultrasonic inspection system responsive to reflections from discontinuities within an object of recurrent transmitted pulses of ultrasonic energy comprising:
- ultrasonic transducer means,
- transmitter means for pulse energizing said transducer means for recurrently transmitting ultrasonic energy into an object, said transducer means receiving reflected ultrasonic wave pulses from over a range of distances within the object and converting the same to ultrasonic electrical signals,
- visual display means,
- means for processing ultrasonic electrical signals from the transducer means received over said range to form data for display at said visual display means of at least one line of reflected signal information,
- means for converting ultrasonic electrical signals from the transducer means which are received from over at least a portion of said range to an audio frequency signal,
- electro-acoustic transducer means responsive to the audio frequency signal from said converting means to provide an audible presentation thereof,
- moving cursor signal generator means for generating a moving cursor signal for display at said visual display means, the movement of which cursor is synchronized with the audible presentation from the electro-acoustic transducer means,
- a signal generator for generating an audio range marker signal at a selected time during operation of said ultrasonic electrical signal converting means, and
- means for combining said audio range marker signal with the audio frequency signal from said ultrasonic electrical signal converting means to provide the audible presentation with an audible marker signal.

* * * * *